United States Patent
Karlsson et al.

[11] Patent Number: 5,863,162
[45] Date of Patent: Jan. 26, 1999

[54] TOOL BODY AND REMOVABLE TOOL TIP FOR CHIP REMOVING MACHINING

[75] Inventors: Ronny Karlsson, Valdermarsvik; Olle Wagne, Linköping, both of Sweden

[73] Assignee: Seco Tools AB, Fagersta, Sweden

[21] Appl. No.: 963,615

[22] Filed: Nov. 4, 1997

[30] Foreign Application Priority Data

Nov. 4, 1996 [SE] Sweden ................................. 9604039

[51] Int. Cl.$^6$ ............................................. B23B 51/00
[52] U.S. Cl. ........................... 408/230; 408/57; 408/233; 408/713
[58] Field of Search ...................... 408/233, 230, 408/231, 59, 77, 713

[56] References Cited

U.S. PATENT DOCUMENTS

| | | | |
|---|---|---|---|
| 1,063,215 | 6/1913 | Ream | 408/233 |
| 1,097,620 | 5/1914 | Gervais | 408/231 |
| 1,746,716 | 2/1930 | Sasse | 408/231 |
| 1,774,050 | 8/1930 | Brown | 408/231 |
| 2,259,611 | 10/1941 | Burger | 408/230 |
| 2,425,988 | 8/1947 | Brisben | 408/233 |
| 4,979,851 | 12/1990 | Hunt | 408/233 |
| 5,391,022 | 2/1995 | Nakayama et al. | 408/233 |
| 5,399,051 | 3/1995 | Aken et al. | 408/233 |
| 5,425,604 | 6/1995 | Scheer et al. | 408/233 |

FOREIGN PATENT DOCUMENTS

| | | |
|---|---|---|
| 1 233 953 | 6/1971 | United Kingdom . |
| WO96/34714 | 11/1996 | WIPO . |

*Primary Examiner*—Steven C. Bishop
*Assistant Examiner*—Adesh Bhargava
*Attorney, Agent, or Firm*—Burns, Doane, Swecker & Mathis, L.L.P.

[57] ABSTRACT

A metal cutting tool includes a tool body rotatable about a center axis and a tool tip mounted on a front surface of said tool body for performing a cutting operation. A draw bar mounted axially in the tool body draws a rear surface of the tool tip toward the front surface of the tool body. Those front and rear surfaces include radial projections and radial recesses receiving the projections. The projections are wedgingly connected in the recesses to transmit all axial and rotational forces between the tool body and tool tip.

21 Claims, 4 Drawing Sheets

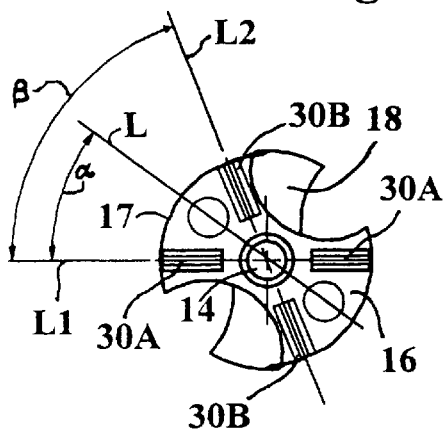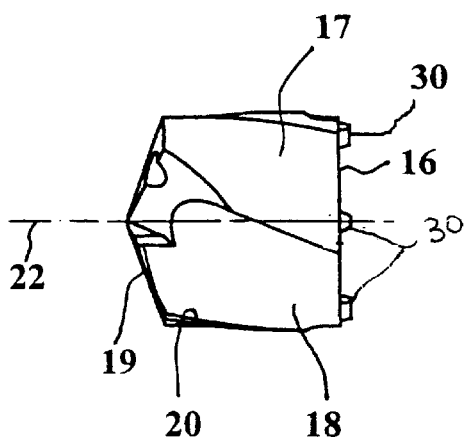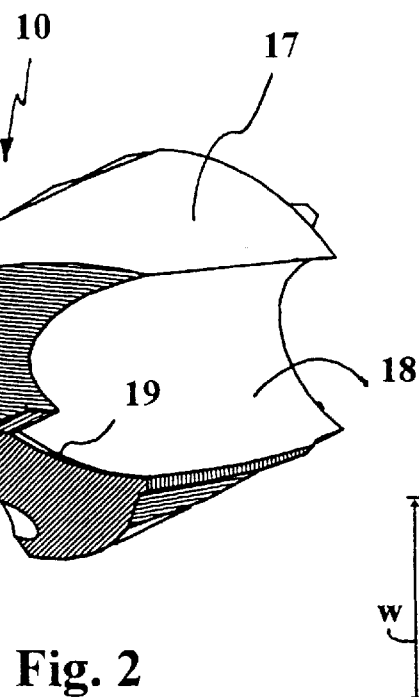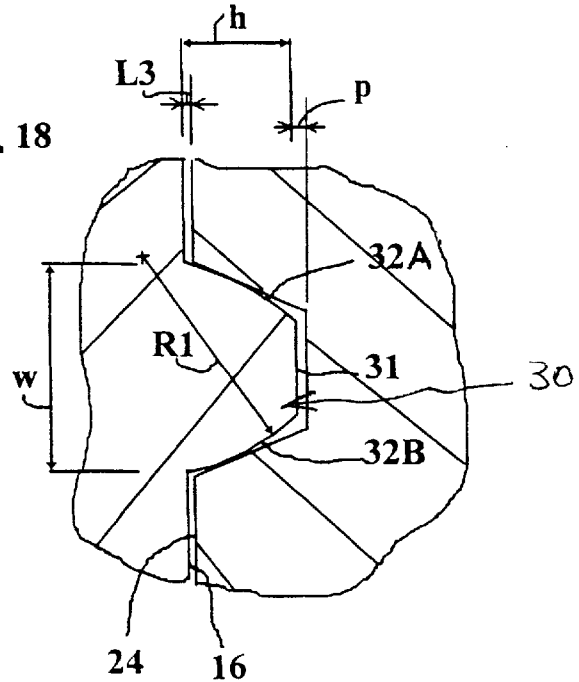

TOOL BODY AND REMOVABLE TOOL TIP FOR CHIP REMOVING MACHINING

BACKGROUND OF THE INVENTION

The present invention relates to a tool for rotary, chip removing machining, comprising a tool body, a tool tip and means for retention. The tool body has a front surface and the tool tip has an end surface provided to detachably face each other. The body has a shank portion. The invention also relates to a separate tool tip and a tool body.

PRIOR ART

It is previously known to use interchangeable cutting edges on different types of tools for chip removing machining. This technique has however its practical limitation for strength reasons in milling and drilling tools which rotate around a longitudinal axis.

Through German Document 19 50 718 there is previously known a tool with a detachable tool tip anchored in a body by means of a central screw. In that known tool, mutually abutting shoulders transfer torque created during drilling, between the tool tip and the tool body. Such a tool suffers from a number of drawbacks, such as the tool tip being unable to have central cutting edges, since the screw occupies the central portion. Also, the tool tip contains less cemented carbide due to the hole formed therein to accommodate the screw and therefore a propensity for crack formation increases. In addition, tolerance problems arise in connection with the known tool since a tangential gap must exist between the shoulders due to normal manufacturing tolerances, and therefore the tip will rotate somewhat relative to the tool body at the start of a machining operation.

OBJECTS OF THE INVENTION

One object of the present invention is to provide a design of milling and drilling tools having interchangeable cutting edges, whereby said design eliminates the above-described problems.

Another object of the present invention is to provide a rigid tool preferably for drilling or milling where the tool tip has a wedging cooperation with the tool body such that the clamping force increases with increasing feed force.

Another object of the present invention to provide a rigid tool preferably for drilling or milling where the tool tip easily can be exchanged.

Another object of the present invention is to provide a tool and a tool tip manufactured of injection molded cemented carbide.

Still another object of the present invention is to provide a tool and a tool tip where the movement of the tool tip relative to the tool body is made impossible also after wear of the tool body.

SUMMARY OF THE INVENTION

These and other objects have been achieved by a tool for rotary chip moving machine of a workpiece. The tool comprises a tool body, a tool tip, and a retention member. The tool body has a shank and a front surface, the shank defining an axis of rotation. The tool tip is formed of cemented carbide and has front and rear surfaces. The front surface includes at least one cutting edge. The rear surface faces toward the front surface of the tool body and includes a rearwardly open, central blind hole. The retention member is disposed in the tool body and is engaged in the blind hole. The rear surface of the tool tip and the front surface of the tool body include interengaging projections and recesses for transferring all axial and rotary forces between the cutting tip and the cutting body. Each recess extends along a first line forming an acute angle with a second line along which an adjacent recess extends.

The projections and recesses are preferably wedged axially together, whereby the only contact between the tool body and tool tip is through the projections and recesses. That is, the remaining portions of the rear surface of the tool tip and the front surface of the tool body are spaced axially apart from one another.

The present invention also relates to the tool tip itself, and to the tool body in combination with the retention member.

DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 2 shows a tool tip according to the present invention in a front perspective view;

FIG. 3A shows the tool tip in a side view;

FIG. 3B shows an enlarged part of the tool tip shown in FIG. 3A;

FIG. 5 shows the tool tip in a rear end view;

DETAILED DESCRIPTION OF A PREFERRED EMBODIMENT OF THE INVENTION

Figure 1:
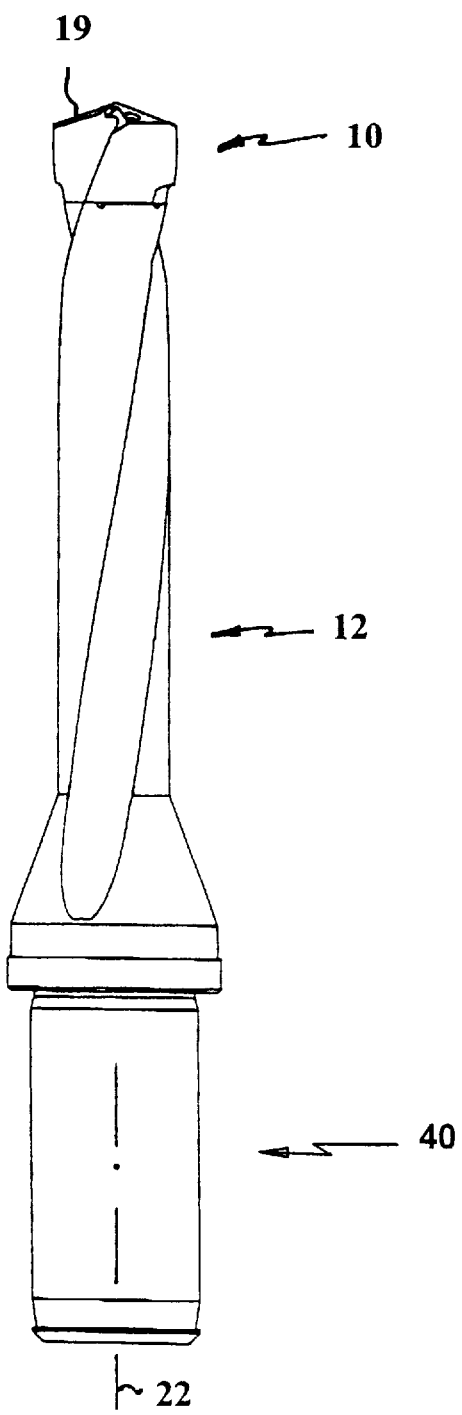
FIG. 1 shows a drilling tool according to the present invention, in a side view.

The embodiment of a tool according to the invention shown in FIG. 1 is a so called helix drill, which comprises a tool tip 10, a pull rod, a drill body 12 and a nut (not shown).

The tool tip 10 is provided with at least one cutting edge 19 at the end facing away from the drill body 12, which is given different design depending on the field of application. In this manner, the cutting edge or the cutting edges is/are substantially straight and parallel with the longitudinal center axis of the tool tip when the tool is an end mill, while the cutting edges are circular when the tool is a ball nose end mill. The forward end of the tool tip 10 shows in the figures a cutting edge 19 for the tool as a drill. The appearance and the area of application for the tool can vary in several ways.

The tool tip 10 is performed of hard material, preferably cemented carbide and most preferably of injection molded cemented carbide and comprises two front or upper clearance surfaces 15, a rear end surface 16 as well as first 17 and second 18 curved surfaces interconnecting the surfaces 15 and 16 (FIGS. 2–6). All these surfaces and associated edges are formed of the same material, i.e. preferably injection molded cemented carbide. The lines of intersection between the second curved surfaces or the chip flutes 18 and the clearance surfaces 15 form main cutting edges 19, preferably via, reinforcing chamfers. The cutting edge extends from the tool periphery to the area of the tool axis of rotation 22. The lines of intersection between the first curved surfaces 17 and the chip flutes 18 form secondary cutting edges 20. The chip flute can alternatively be adapted for a drill body with straight chip flutes. The tool tip preferably also comprises a coring-out surface 21, which extends to the center of the tool tip and which forms an angle, FIG. 6, with the tool axis of rotation 22. The largest diameter of the tool is defined by the diametrical distance between the radial extreme points of the secondary cutting edges 20. The axial height of the tool tip is substantially the same as the largest diameter, in order to minimize the wear from chips on the joint between the tool tip and the drill body. The largest diameter of the end surface 16 is preferably less than the largest diameter of the tool tip, in order to provide clearance during machining. Flushing holes 23, substantially parallel to the rotational axis 22, run through the tool tip from the end surface 16 to the orifice in each upper clearance surface 15. The flushing holes are intersected by a diametrical line L (FIG. 5) which crosses the rotational axis 22.

The end surface 16 is provided with a number of rearwardly protruding radially extending, spaced-apart substantially identical lips 30. The lips 30 are preferably four in number and consist of two pairs of projections in the form of lips 30A and 30B, wherein each pair is arranged on a respective line L1 and L2, respectively, extending substantially perpendicular to the axis 22 (FIG. 5). The imaginary lines L1 and L2 intersect the axis 22 and extend on each side of the line L to form an "X" shape with one another. The line L1 forms an acute angle $\alpha$ with the line L and the line L2 forms an acute angle $\beta$ with the line L1.

Each lip 30 comprises a planar, rearwardly facing surface 31, spaced from the axis 22, which connects to two convex flanks 32A, 32B. Each flank is defined, in the cross section according to FIG. 3B, by a radius R1, the center of which preferably lies in the tool tip and is situated radially outwardly and axially forwardly of the lip. The radius R1 is about 1 to 1.5 mm. The lips 30A are oblong and extend radially inwardly from the first curved surface or the envelope surface 17 a distance towards a central threaded recess or blind hole 14 of the tool tip. The distance between the flanks 32A, 32B diminishes rearwardly, i.e., each lip has an axial height h and a largest width w at its forward end. Thus, each lip tapers toward surface 31. The height h is maximum 1 mm and the width w is 0.6 to 2 mm. The number of lips 30 depends indirectly of the diameter of the tool tip, said number varying between 2 and 6 lips.

Figure 6:
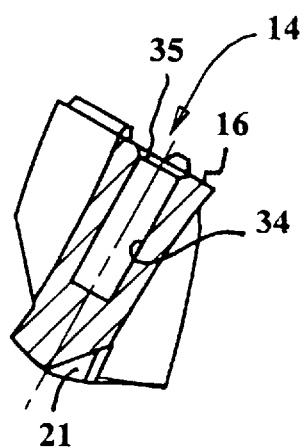
FIG. 6 shows a cross-section taken along the line VI—VI in FIG. 4.

The end surface 16 is provided with the blind hole 14, which in the shown embodiment comprises a threaded recess 34 as well as an enlarged conical entering surface 35 (FIG. 6).

A pull rod (a front end 36 thereof shown in FIG. 7A) extends axially through the tool body 12 and has a threaded portion 36 at its front end facing the tool tip, which threaded portion is intended to be connected in the threaded recess 34 during a cutting operation. A further externally threaded portion is arranged at the other (rear) end of the pull rod, to cooperate with a cylindrical nut (not shown) provided with a key grip to enable the pull rod to be rotated by an implement, whereby the pull rod pulls the tool tip against the tool body. Such a pull rod arrangement is disclosed in commonly owned U.S. application Ser. No. 08/945,908, and the disclosure thereof is incorporated herein by reference.

Figure 7A:
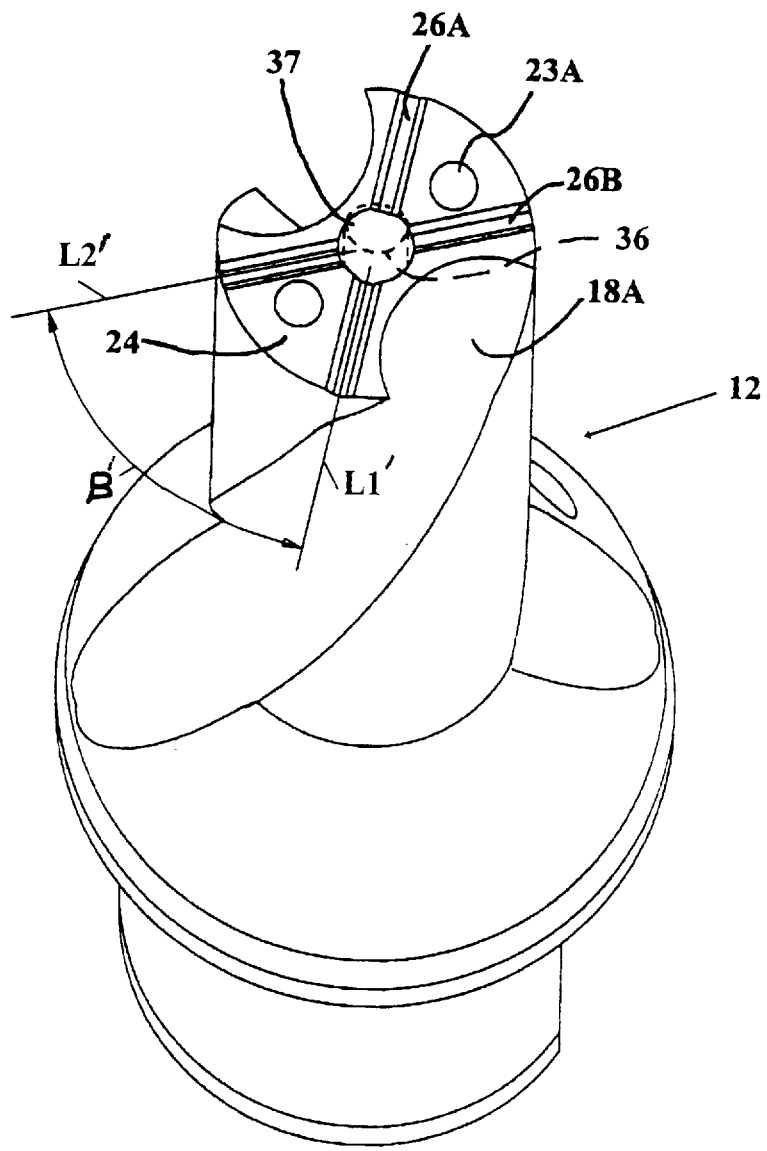
FIG. 7A shows a tool body according to the present invention in a perspective view.
Figure 4:
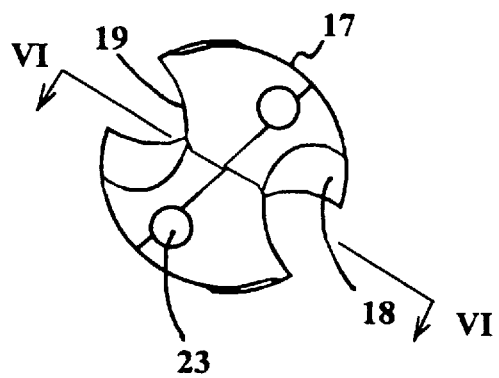
FIG. 4 shows the tool tip in a front end view.

The drill body is according to FIG. 7A is provided with flush channels 23A, which follow the protruding lands of the drill along a helical path at a substantially constant distance from the rotational axis 22. The drill body has screw-shaped chip flutes 18A or straight chip flutes and these can extend along the entire body or along a part thereof.

The drill body 12 is provided with a front surface 24 facing the tool tip 10, which surface during mounting is arranged close to the rear end surface 16 of the tool tip 10, but preferably does not contact this surface 16, i.e., a gap L3 is created therebetween (FIG. 3B). The largest diameter of the front surface 24 is smaller than the largest diameter of the tool tip, but preferably the same as the smallest diameter of the tool tip. A central channel 37 is provided in the drill body 12. The channel 37 extends through the entire body and terminates centrally in the front surface 24 of the drill body. The pull rod extends through that channel 37.

Figure 7B:
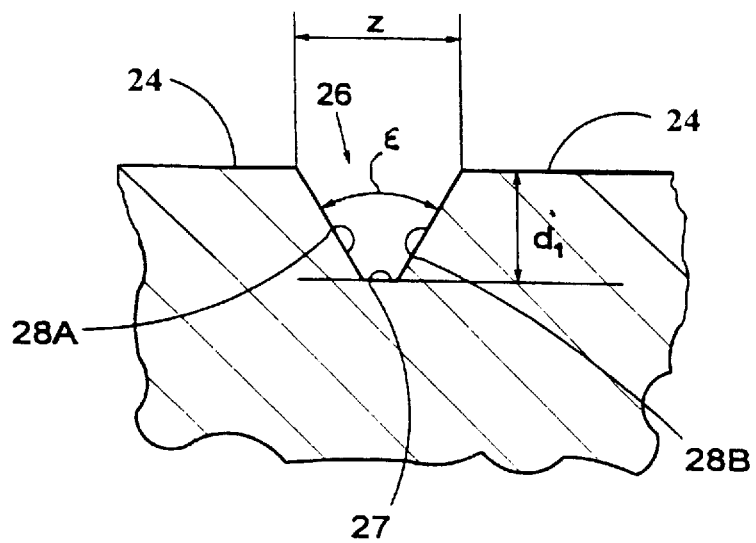
FIG. 7B shows a part of the tool body in cross section.

The front surface 24 is provided with a number of spaced, radially extending, identical recesses in the form of grooves 26A, 26B, each of which in cross-section describes a substantially V-shaped or trapezoidal path (FIG. 7B). The grooves are oblong and extend along essentially the entire front surface, and pass through the channel 37. Each groove forms an acute angle with an imaginary line intersecting the centers of both flushing holes 23A. The grooves 26A, 26B substantially form an X in the front surface 24, wherein the smallest included acute angle $\beta'$ is about 50° to 70°. The grooves 26A, 26B coincide with respective imaginary radial lines L1' and L2' respectively, extending substantially perpendicular to the axis 22. The imaginary lines L1' and L2' intersect at the axis 22 and define the acute angle $\beta'$. The angles $\beta$ and $\beta'$ are equal. Each groove 26 has two flanks 28A, 28B, which, via a sharp or rounded transition, connects to the groove bottom 27. The flanks form an acute angle $\epsilon$ with each other. The angle $\epsilon$ lies within the range of 40° to 80°, preferably 55° to 60°. A portion of the front surface 24 lies along at each side of the grooves 26. The front surface 24 connects to the associated flank via an obtuse inner, soft or sharp, transition. The number of grooves 26, which depends on how the end surface of the tool tip is formed, is the same as the number of lip pairs which the end surface has, and therefore the number is chosen in the interval of 2 to 6 grooves. The groove has a depth $d_1$ and largest width z.

The lip height h is 50% to 95% of the depth d of the groove 26 and the largest width w of the lip is larger than the largest width z of the groove. This means that when mounting the tool tip, a gap L4 arises between the external surface 31 and the bottom 27 when mounting the tool tip in the tool body. The gap L4 ensures that the flanks engage with each other and that the bottom does not support the cutting insert, and therefore tilting is avoided. The gap L3 thereby arises also between surfaces 16 and 24. The lips and the grooves form, in mounted condition, a joint with a number of wedging connections which produce an increase in the frictional force in response to increasing axial feed force. Another advantage with said wedging effect is that it allows some obliquely (i.e., axial offset) positioning of the lips and the grooves relative to each other during the start of the mounting, the lips and grooves being then guided correctly by their geometries during drawing-in of the tool tip 10 by the drawbar. The joint or interface between the tool tip 10 and tool body 12 is placed such that it mostly will be situated in the drilled hole during the drilling. The ends of each lip pair should be as far from each other as possible in the radial direction for best transfer of torque.

Mounting of the tool tip 10 on the drill body 12 is completed as follows. The pull rod is brought into and through the central channel 37 of the drill body 12 until a nut, which is connected with the axially rear end of the pull rod, abuts against a contact surface. The forward threaded portion 36 of the pull rod thereby projects centrally from the front surface 24. Then the threaded portion 36 is brought into the blind hole 14 and the tool tip is rotated onto the pull rod.

Then the lips 30A, 30B of the tool tip are brought by hand into contact with the grooves of the front surface 24. During subsequent rotation of the nut, the tool tip 10 will be firmly drawn rearwardly against the front surface 24, i.e., the position according to FIG. 1 has been achieved. In this position the end surface 16 of the tool tip will not abut against the front surface 24 since the gap L3 is provided therebetween. The gap is L3 is of the magnitude of 0.01 to 0.1 mm for avoiding tilting of the tool tip relative to the tool body. The tool tip 10 is now anchored in the drill body 12 in a satisfactory manner. The pull rod is in this position substantially intended to retain the tool tip during extraction of the tool from the machined hole. The lips and the grooves transmit the forces and torque which are created by chip removing machining. However, the axial force from the pull rod is large enough to counter-act a loose fit at the joint between the tool tip and the body during tool extraction. The lips and the grooves do not intersect the chip flutes 18, 18A.

The combination of the lips/grooves and the threaded connection between the tool tip and the pull rod serves three purposes, namely to place the tool tip 10 in a centered position (with an out-of-truth measure of less than 0.02 mm) in the drill body at mounting; to transfer torque; and to ensure at application of the cutting tool that the tool tip 10 is always held in its fixed position.

A drill according to the present invention contains much cemented carbide and it unloads the pull rod both radially and axially.

After mounting of the tool tip the lips 30 and the grooves 26 will form linear contact surfaces. The contact surfaces of the lips and the grooves substantially lie in a common plane. The height of the profile of the contact surfaces is maximum 20% of the height of the tool tip. Since the major portions of the front surface 24 and the end surface 16 are substantially planar they will be separated by the distance L3 in the mounted position. The tool tip 10 can be detachably connected to or be disconnected from the front surface 24 when the end 36 of the pull rod is unscrewed, i.e., when the front end of the pull rod is moved from a first axially forward position to a second axially rear position.

When the tool tip 10 shall be exchanged, the above steps are reversed, whereby the tool tip 10 can be removed from the drill body 12 and be replaced.

From the above described embodiment it will be appreciated that the tool tip has a wedging cooperation with the tool body such that the clamping force or the frictional force, i.e. the resistance against radial motion of the tool tip relative to the body, increases with increasing feed force. In addition the means for retention is provided to influence the tool tip in the same direction as the feed force during drilling, i.e., the pull rod draws the tool tip axially rearwards substantially in the same direction as the feed force acts.

It is understood that the geometries of the cooperating lips and grooves can be varied within the spirit of the present invention without departing from the scope of the claims. Consequently the geometries may assume the cross sections of most conventional threads (however with a degree of overlap of maximum 95%), for example trapezoid shape on both cooperating surfaces. The invention is serviceable also with milling cutters. The tool tip is preferably coated with layers of for example $Al_2O_3$, TiN and/or TiCN. In certain cases, it can be well-founded to coat the cutting edges with super hard material such as PCD.

It is also possible to utilize clamping means other than a central pull rod. For example, it is the possible to maintain the tool tip by means of a wedge, movable perpendicularly to the rotational axis and acting on a pull rod.

Furthermore it shall be noted that the above described embodiments relate to tools which rotate relative to a longitudinal axis or to the workplace center axis and that the means for retention rotates with the tool. Alternatively, the tool can be stationary and used in combination with a rotating work piece.

Although the present invention has been described in connection with a preferred embodiment thereof, it will be appreciated by those skilled in the art that additions, modifications, substitutions and deletions not specifically described, may be made without departing from the spirit and scope of the invention as defined by the appended claims.

What is claimed is:

1. A tool for rotary chip removing of a workpiece, comprising:
    a tool body having a shank and a front surface, said shank defining an axis of rotation;
    a tool tip formed of cemented carbide and having front and rear surfaces, said front surface including at least one cutting edge; said rear surface facing said front surface of said tool body and including a rearwardly open central blind hole; and
    a retention member disposed in said tool body and engaged in said blind hole;
    said rear surface of said tool tip and said front surface of said tool body including interengaging projections and recesses for transferring all axial and rotary forces between said cutting tip and said cutting body, each recess extending along a first line forming an acute angle with a second line along which an adjacent recess extends.

2. The tool according to claim 1 wherein said projections and recesses are wedged axially together.

3. The tool according to claim 2 wherein there are at least two pairs of circumferential projections disposed radially outwardly from the axis.

4. The tool according to claim 2 wherein said projections comprise elongated lips, and said recesses comprise elongated grooves making contact with said lips along linear contact surfaces.

5. The tool according to claim 4 wherein said grooves and lips extend substantially radially with reference to said axis.

6. The tool according to claim 1 wherein said projections are disposed on said rear surface of said tool tip, and said recesses are formed in said front surface of said tool body.

7. The tool according to claim 2 wherein said rear surface of said tool tip and said front surface of said tool body include respective generally planar portions on which said projections and recesses are formed, said planar portions being spaced axially apart by the engagement between said projections and recesses.

8. The tool according to claim 7 wherein said projections include wedge-shaped flanks, and axial facing end surfaces; said recesses including wedge-shaped flanks engaging said flanks of said projections; said recesses including axially facing surfaces spaced axially from said axially spaced surfaces of said projections.

9. The tool according to claim 8 wherein an axial dimension of each the projection is from 50 to 95% of an axial dimension of its respective recess.

10. The tool according to claim 9 wherein the number of projections is from two to six.

11. The tool according to claim 1 wherein the retention member is axially movable in said tool body, said tool tip being removable from said tool body in response to rearward movement of said retention member.

12. The tool according to claim 11 wherein said retention number is removably connected within said blind hole by a screw thread connection.

13. The tool according to claim 12 wherein said recesses and projections have corresponding wedge shapes.

14. The tool according to claim 13, further including flush channels extending through said tool body and said tool tip for conducting flushing medium.

15. The tool according to claim 1 wherein the cutting edge extends from an outer periphery of said tool tip to a location adjacent a center of said tool tip.

16. A rotary tool tip for chip removing machinery, said tip formed of cemented carbide and generally having a circular shape with front and rear surfaces defining a center axis, said front surface including at least one edge of one piece integral construction, therewith, and extending from an outer periphery of said tool tip to a location adjacent said axis, said rear surface having rearwardly protruding projections adapted to be received in recesses of a tool body, said projections extending along respective lines forming acute angles with one another, said rear surface including a rearwardly open blind hole adapted to receive a retention member for securing said tool tip to a tool body.

17. The tool tip according to claim 16 wherein said projections include side flanks of convex shape and are spaced from said blind hole.

18. The tool tip according to claim 16 wherein said projections extend substantially radially with reference to said axis.

19. The tool according to claim 18 wherein said blind hole includes internal screw threads.

20. A rotary tool body in combination with a retention member, said tool body comprising a shank defining an axis of rotation, a front surface adapted to receive a cutting tip, and an outer peripheral surface including chip flutes; said front surfaces including recesses arranged on respective lines forming acute angles with one another; said tool body including a control channel extending therethrough receiving said retention member, said retention member adapted to be secured to a tool tip.

21. The body according to claim 20 wherein each of said recesses has a generally V-shaped cross section.

* * * * *